United States Patent [19]

Beeman

[11] Patent Number: 4,590,601
[45] Date of Patent: May 20, 1986

[54] PSEUDO RANDOM FRAMING DETECTOR CIRCUIT

[75] Inventor: Robert H. Beeman, Scottsdale, Ariz.

[73] Assignee: GTE Communication Systems Corporation, Phoenix, Ariz.

[21] Appl. No.: 685,702

[22] Filed: Dec. 24, 1984

[51] Int. Cl.[4] .......................... H04J 3/06; H04L 7/08
[52] U.S. Cl. ...................... 375/115; 331/78; 364/717
[58] Field of Search ............... 375/111, 115, 1, 108, 375/113, 114, 116, 106; 328/63; 370/107; 331/78; 364/717; 307/269

[56] References Cited

U.S. PATENT DOCUMENTS

| | | | |
|---|---|---|---|
| 3,731,198 | 5/1973 | Blasbalg | 375/1 |
| 3,798,544 | 3/1974 | Norman | 375/1 |
| 3,854,011 | 12/1974 | Mallory et al. | 370/107 |
| 4,475,208 | 10/1984 | Ricketts | 375/1 |

Primary Examiner—Marc E. Bookbinder
Assistant Examiner—M. Huseman
Attorney, Agent, or Firm—Frank J. Bogacz; Peter Xiarhos

[57] ABSTRACT

This invention is a circuit for detecting a framing pattern consisting of a pseudo random shift register sequence. This circuit utilizes an extremely long framing pattern without either a large amount of memory or the need to receive a large number of bits in order to recognize the framing pattern. The use of lengthy framing patterns minimizes the chance of false framing caused by patterns in bit positions other than the framing bit position. In addition, the incoming data stream may be connected directly to the shift register mechanism.

7 Claims, 2 Drawing Figures

PSEUDO RANDOM FRAMING DETECTOR CIRCUIT

CROSS-REFERENCE TO RELATED APPLICATIONS

The present application is related to copending U.S. patent application Ser. No. 685,701 which is assigned to the same Assignee and has the same inventive entity as the present case.

BACKGROUND OF THE INVENTION

The present invention pertains to digital communications and transmission systems and more particularly to framing information transmitted along with data used to identify various fields within the data stream.

In the past, framing patterns have been limited to a small number of bits. For example, the T-carrier systems used in telephony originally employed a framing pattern consisting of alternating ones and zeros. Later, this framing pattern was replaced by two interleaved patterns, one to identify frames and a second pattern to identify a "superframe", a larger frame consisting of 12 ordinary frames. The first pattern is a basic pattern of alternating ones and zeros. These framing bits occur in alternate framing bit positions and identify the framing bit position within a frame of 193 bits. The second framing pattern, interleaved with the first, is a pattern of (111000). This framing pattern identifies the alignment of the superframe relative to the ordinary frames.

Another modification to the framing pattern introduced extended superframe. Extended superframing is a technique wherein the basic framing pattern occurs only every fourth frame and identifies a 24 frame pattern. Since this framing pattern is only 6 bits long, a relatively high potential for false framing is created. This can occur when a particular data bit pattern corresponds to the framing bit pattern.

In a superframe transmission system, the alternating ones and zeros with a period of four frames was sometimes imitated by the sign bit of a PCM encoded 2 KHZ sine wave from certain types of data modems. If the carrier system lost framing while this 2 KHZ modem signal was being transmitted on one of the voice channels, the framing circuit could mistake the sign bit of the voice channel for the framing bit. This situation would result in misframing for all 24 channels for considerable periods of time. Similar problems would result with other framing patterns.

The above problem could be solved by use of a longer and more complex framing pattern, but this introduces several new problems when previously known techniques are employed. The first problem is that as the framing pattern length is increased, the amount of hardware needed to generate and detect the framing pattern increases correspondingly. For example, a 12 bit framing pattern would require twice as much transmission and detection hardware as a 6 bit framing pattern. Thus, longer framing patterns necessitate increased pattern generation and detection hardware.

A second problem is that as the framing pattern length is increased, the time required to transmit the entire framing pattern increases proportionally. For T-carrier systems, the framing bit position is 1 bit out of a 193 bits and occurs only eight thousand times per second. For the extended superframing situation, the framing bit occurs only two thousand times per second. Since the entire framing pattern must be received before it can be recognized, searching for a long pattern through all possible bit positions in either the original T1 carrier or the extended superframing systems would require a great amount of time if a longer pattern were used.

Another problem with short framing bit patterns arises when multiple levels of multiplexing are employed in a system. Unless a different framing pattern is used for each multiplexing level, there is a danger of a higher level framing circuit falsely locking onto a lower level framing bit pattern. Separate framing patterns for each level would require long patterns, so that the pattern at each level could be orthogonal to patterns at lower levels. In present day T-carrier multiplexers, the problem is dealt with by using different frame length for each level of multiplexing. This causes lower level patterns to slide through the higher level patterns, eliminating confusion between them. However, the situation also requires demultiplexing of all channels in the high level stream in order to recover even one data channel at the lowest level of multiplexing.

SUMMARY OF THE INVENTION

One digital telecommunications system is connected to another digital telecommunications system by transmission equipment. Framing data and transmission data are interleaved and transmitted from one system to the other. A pseudo random framing detector circuit for recovering periodic framing data from the interleaved data is contained in each digital telecommunications system.

The pseudo random framing detector circuit includes a clock which is connected to the transmission equipment. The clock operates in response to the interleaved data which is received via the transmission equipment to produce a periodic clock signal of a predetermined frequency. A frame sizing circuit is connected to the clock. The frame sizing circuit operates in response to the periodic signal of the clock to produce a second periodic signal of a period which is equal to the length in bits of the framing data plus the transmission data.

The pseudo random framing detector circuit also includes a gating circuit. In addition, a shift-register arrangement of the detector circuit is connected to the frame sizing circuit and to the transmission equipment. The shift-register arrangement includes a number of tap outputs and an input. The shift-register arrangement cyclically operates in response to the second periodic signal to produce a number of tap output signals on the corresponding number of tap outputs. At least two of the tap outputs of the shift-register arrangement are connected to the gating circuit. Each of the connected tap outputs is a logic 1 bit positional representation corresponding to any polynomial of maximal length for a particular size of the shift-register arrangement.

The gating circuit is connected to those tap outputs of the shift-register arrangement which are a logic 1 bit positional representation of any maximal length polynomial. The gating circuit cyclically operates in response to these tap output signals to produce the framing data.

The pseudo random framing detector circuit also includes framing control circuit. In addition, the detector circuit includes a switch. The switch arrangement is connected to the transmission equipment, to the framing control circuit, to the gating circuit and to the input of the shift-register arrangement. The switch operates in response to the framing control circuit to connect the gating circuit to the input of the shift-register arrangement or the switch operates to connect the transmission equipment to the input of the shift-register arrangement.

The framing control circuit is also connected to the frame sizing circuit. The framing control circuit operates to select the switch in order to input the framing data to the shift-register arrangement or operates the switch in order to input the interleaved data to the shift-register arrangement. The framing control circuit is also connected to the logic of the system. The framing control circuit also operates to transmit the framing data to the logic of the system.

A BRIEF DESCRIPTION OF THE DRAWINGS

DESCRIPTION OF THE PREFERRED EMBODIMENT

Figure 1:
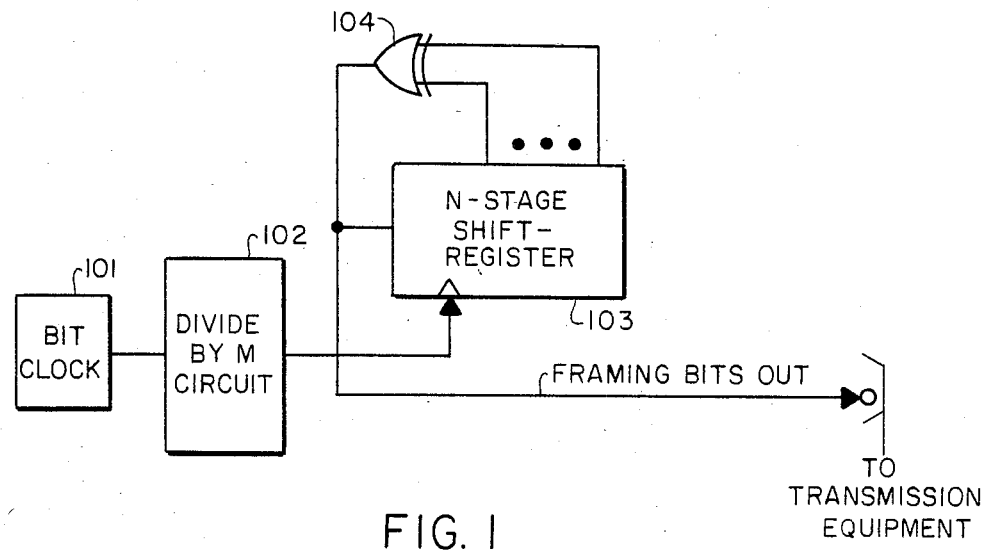
FIG. 1 is a schematic diagram of a pseudo random framing transmitter circuit embodying the principles of operation of the present invention.

Referring to FIG. 1, the transmitter section of a pseudo random framing circuit is shown. Bit clock 101 is connected to divide by M circuit 102. Divide by M circuit 102 is connected to the clock input of N-stage shift-register 103. N-stage shift-register 103 has two or more output tap connections to exclusive OR gate 104. Exclusive OR gate 104 has its output connected to the input of N-stage shift-register 103. In addition, the output of exclusive OR gate 104 is also connected to the transmission equipment via the FRAMING BITS OUT lead.

Thus, the framing pattern output on the FRAMING BITS OUT lead is generated using a transmit shift-register with feedback logic which implements a polynomial which gives a maximal length pseudo random pattern. The input to the first stage of the shift-register (and also the framing pattern output) is the output of the feedback logic 104.

With a maximal length polynomial, the length of a repeating pattern is (2 raised to the power N) minus 1 or $(2^N) - 1$, where N is the length in bits of a shift-register. This relationship is shown in Chapter 3 of SHIFT REGISTER SEQUENCES by Golomb Soloman, revised edition, 1981, published by Aegean Park Press. SHIFT REGISTER SEQUENCES by Golomb Soloman is hereby incorporated by reference and made a part hereof. For example, a 10 bit shift-register produces a random pattern of 1023 bits before the same pattern is repeated. This is accomplished by having the shift-register 103 shift to the right by 1 bit position each time a framing bit is required. The larger the value of N chosen, the less the probability that a data sequence will imitate a framing sequence. A 10 bit shift-register seems to be a practical implementation.

The N-stage shift-register 103 has tap outputs available from each bit or stage of the shift-register. Some of these tap outputs are shown connected to the input of exclusive OR gate 104. The number of connections from the shift-register 103 to gate 104 and their relative position within the shift-register may be inferred from tables found in the Soloman reference cited above. For example, a 10 bit shift-register would provide a period of 1023 bits before repeating a sequence. One polynomial corresponding to this period is 2011 octal or base eight. To determine the connections from the shift-register to the exclusive OR gate for this polynomial, the octal representation should be depicted in binary. With this binary depiction, the first 10 bits from the right are chosen. Each bit position corresponds to one tap output of the shift-register. In the binary form of this polynomial, a 1 in a particular bit position indicates a connection from that corresponding tap output to the exclusive OR gate 104. For the polynomial 2011, connections from the shift-register to exclusive OR gate 104 would exist for bit position 0 (the right most bit position) and bit position 3.

For each shift-register length, N, there are a number of different tap output configurations (polynomials) which give maximal length sequences. These polynomials may be found in the Soloman reference. For example, for a 10 bit shift-register, the Soloman reference shows many polynomials of maximal length, that is 1023. Table III-5 of the Soloman reference indicates there would be 60 possible polynomials however, not all would be of maximal length. It has been shown that maximal length pseudo random sequences produced by polynomials are optimum with respect to auto-correlation and cross-correlation. Thus, for the same length shift-register N, numerous sequences can be generated, each having minimum correlation with shifted versions of itself or with sequences produced by other polynomials. As a result, use of different polynomials to generate different tap output configurations permits multiple levels of multiplexing data without confusion between framing bits of different levels. In addition, this eliminates the need for different frame lengths for each level of multiplexing.

A simple example will serve to illustrate the principles discussed above. Assume that the length of shift-register 103 is 4 bits. For a 4 bit long shift-register, the Soloman reference indicates that there are three possible polynomials. Two of these three polynomials are of maximal length. The octal representation of these two maximal length polynomials is 23 and 31. For our example, we will consider the maximal length polynomial 23 in octal. The octal 23 yields a binary representation of 10011. Since, we are working with a 4 bit shift-register, the first 4 bits from the right are chosen, which yields 0011, reading from left to right. In this case, bit positions 0 and 1 (right justified) are connected from shift-register 103 to exclusive OR gate 104.

TABLE 1

| 4 BIT - 15 STATE SEQUENCE | |
|---|---|
| STATE # | BIT POSITIONS |
| 1 | 0001 |
| 2 | 1000 |
| 3 | 0100 |
| 4 | 0010 |
| 5 | 1001 |
| 6 | 1100 |
| 7 | 0110 |
| 8 | 1011 |
| 9 | 0101 |
| 10 | 1010 |
| 11 | 1101 |
| 12 | 1110 |
| 13 | 1111 |
| 14 | 0111 |
| 15 | 0011 |
| 1 | 0001 |

Table 1 shows the contents for a 4 bit shift register 103 with tap output connected for polynomial 23 octal. The bit positions of shift-register 103 are shown for each state of the shift-register sequence. The shift-register state of all four zeros is illegal. The bit position shown in Table 1 are bits 0 through 3, right justified. Bit 3, the left most bit, for example, of state #1 contains a 1 in bit position zero and a zero in bit positions 1, 2 and 3. Bit 3 is a zero for state #1, as can be seen from Table 1.

As shown in Table 1, the output of exclusive OR gate 104 generates 15 pseudo random states before state #1 is repeated. This is exactly what is expected, since as previously stated a maximal length polynomial yields $(2^N)-1$ pseudo random states. For this example, N is equal to 4. Therefore, we should see $(2^4)-1$ or 15 different states. This is exactly what is observed from Table 1.

Circuit 101 generates the frequency of clock signals. The rate at which divider 102 divides the clock, produced by bit clock 101, is given by M. Where M is the number of bits in a frame including the framing bit. For example, in standard T1 carrier framing, M would be equal to 193, 192 data bits plus 1 framing bit.

Figure 2:
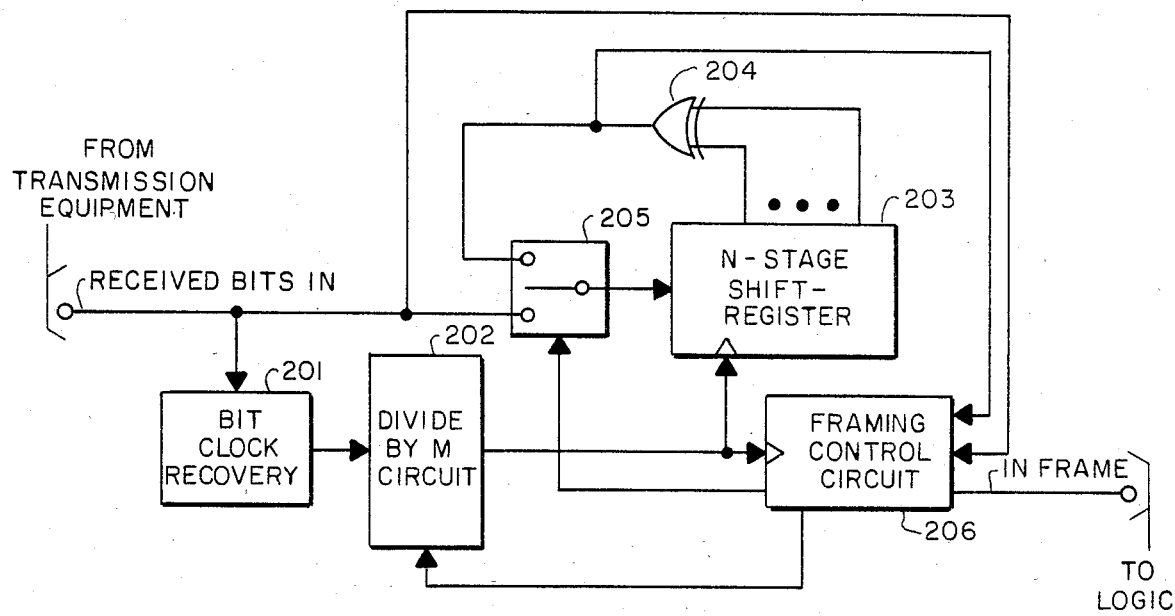
FIG. 2 is a pseudo random framing detector circuit embodying the principles of operation of the present invention.

Now turning to FIG. 2, the receiver section of the pseudo random framing circuit is shown. The output of the receiver portion of the transmission equipment (not shown) is connected via the RECEIVED BITS IN lead to bit clock recovery 201 and to switch 205. In addition, the transmission equipment is also connected via the RECEIVED BITS IN lead to framing control circuit 206.

Bit clock recovery 201 is connected to divide by M circuit 202, which sizes the frame. Divide by M circuit 202 has its output connected to the clock input of framing control circuit 206 and to the clock input of N-stage shift-register 203. Framing control circuit 206 is connected to the RESET lead of divide by M circuit 202. Further, framing control circuit 206 is connected to switch 205. Switch 205 is a signal pole double throw switch, or a logic circuit wired to perform the switch function, normally operated to gate the output of exclusive OR gate 204 to the input of N-stage shift-register 203. Switch 205 may be operated by framing control circuit 206 to disconnect the output of exclusive OR gate 204 from the input of N-stage shift-register 203 and to connect the output of the transmission equipment directly to N-stage shift-register 203 via the RECEIVE BITS IN lead.

N-stage shift-register 203 is connected to exclusive OR gate 204 via a number of tap outputs from shift-register 203. The output of exclusive OR gate 204 is connected to switch 205, as mentioned above. In addition, the output of exclusive OR gate 204 is connected to framing control circuit 206. Lastly, framing control circuit 206 is connected to the logic of the digital communications system via the IN FRAME lead.

Receive bits are applied via the RECEIVED BITS IN lead to bit clock recovery circuit 201. Bit clock recovery circuit 201 drives divide by M circuit 202. M is the number of bits including framing bits within a particular frame. Divide by M circuit 202 produces a preliminary framing signal. Since the divide ratio M is equal to the number of bits per frame, a candidate framing bit, which may or may not be the actual framing bit, is identified in the incoming bit stream.

The output of divide by M circuit 202 causes the N-stage shift-register 203 to shift 1 bit to the right. Initially, framing control circuit 206 operates switch 205 such that the RECEIVED BITS IN lead is connected to the input of the N-stage shift-register 203. This shifting continues for N complete cycles of the divide circuit 202. At that time, if the candidate bit is the actual framing bit, the contents of the receive shift-register 203 will agree with the contents of the transmit shift-register. At this time, the frame control circuit 206 may operate switch 205 so that the proper pseudo random framing pattern is continuously generated locally by 203 and 204, without reference to the incoming received bits.

Framing control circuit 206 compares the predicted framing bits from the output of exclusive OR gate 204 with the candidate framing bits which are received via the transmission channel. Framing control logic 206 may be implemented by using an up/down counter for counting the number of agreements in a known number of bits. If the framing control circuit 206 concludes that there is sufficient agreement between the candidate and the predicted framing bits, it produces a signal on the IN FRAME lead. If framing control logic 206 determines that there is insufficient comparison between the candidate and predicted framing bits, control circuit 206 indicates via the RESET lead to divide by M circuit 202 to reset divide circuit 202, and at the same time operates switch 205 so that the input of shift-register 203 is connected to the RECEIVED BITS IN lead. As a result, divide by M circuit 202 selects a different candidate bit position within the frame to be tested as the framing bit. This process continues until proper comparison is found. At that time, the corresponding signal on the IN FRAME lead is produced to indicate the comparison.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a digital telecommunications system, a pseudo random framing detector circuit for recovering periodic framing data and transmitting said framing data to logic of said system, said framing data being interleaved with transmission data received from another digital telecommunications system via transmission equipment, said pseudo random framing detector circuit comprising:

clock means connected to said transmission equipment and being operated to produce a periodic clock signal of a predetermined frequency in response to said interleaved data;

frame sizing means connected to said clock means and being operated in response to said periodic clock signal to produce a second periodic signal of a period equal to the length in bits of said framing data and said transmission data;

gating means;

shift-register means connected to said frame sizing means and, via a switching means, to said transmission equipment, said shift-register means including a plurality of tap outputs and an input, said shift-register means being cyclically operated in response to said second periodic signal to produce a plurality of tap output signals on said corresponding plurality of tap outputs, at least two of said tap outputs being connected to said gating means and each said connected tap output being a logic one bit positional representation corresponding to any polynomial of maximal length for a particular size of said shift-register means;

said gating means connected to said logic one bit positions of said tap outputs, said gating means being cyclically operated in response to said connected tap output signals to produce said framing data;

framing control means;

said switching means connected to said transmission equipment, to said framing control means, to said gating means and to said input of said shift-register means, said switching means being operated in response to said framing control means to connect said gating means to said input of said shift-register means or said switching means being operated in response to said framing control means to connect said transmission equipment to said input of said shift-register means;

said framing control means further connected to said frame sizing means, said framing control means being operated to select said switching means to input said framing data to said shift-register means or to input said interleaved data to said shift-register means; and said framing control means connected to said logic and being further operated to transmit said framing data to said logic of said system.

2. A pseudo random framing detector circuit as claimed in claim 1, said shift-register means including a clock input connected to said frame sizing means via a second periodic signal lead corresponding to said second periodic signal, said shift-register means being operated to displace by one bit position each current tap output signal unidirectionally and to produce said displaced tap output signals on said connected tap outputs.

3. A pseudo random framing detector circuit as claimed in claim 2, said gating means including exclusive OR gating means.

4. A pseudo random framing detector circuit as claimed in claim 3, said exclusive OR gating means including a plurality of inputs and at least one output, said logic one tap outputs being connected to corresponding ones of said exclusive OR gating means inputs and said exclusive OR gating means output being connected to said switching means.

5. A pseudo random framing detector circuit as claimed in claim 4, said framing control means being further connected to said output of said exclusive OR gating means for receiving said framing data.

6. A pseudo random framing detector circuit as claimed in claim 5, said framing control means being further connected to said frame sizing means, said frame sizing means being operated in response to said framing control means to restart said second periodic signal.

7. A pseudo random framing detector circuit as claimed in claim 6, said framing control means being further connected to said transmission equipment and said framing control means being further operated in response to said framing data of said gating means and in response to said interleaved data of said transmission equipment to selectively operate said switching means.

* * * * *